April 29, 1969     G. E. LIGHTNER     3,440,883
ELECTRONIC SEMICONDUCTOR THERMOMETER
Filed Dec. 1, 1966
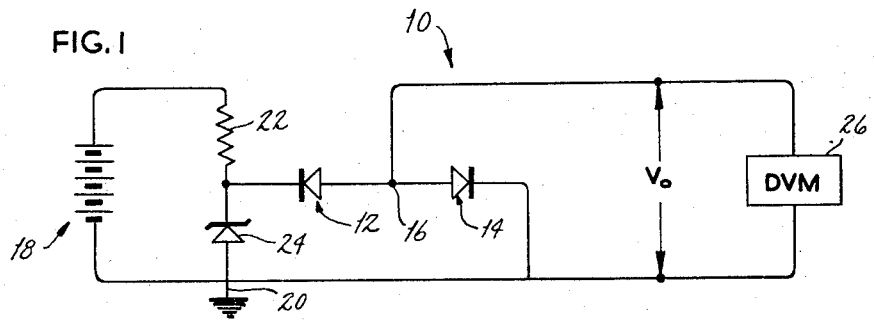
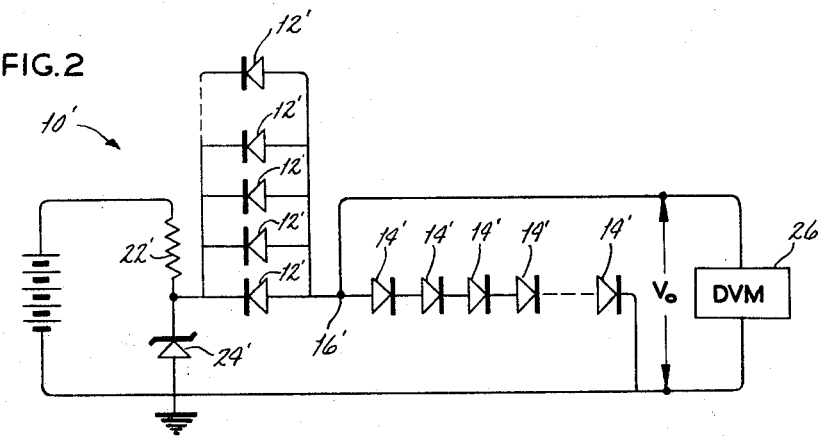
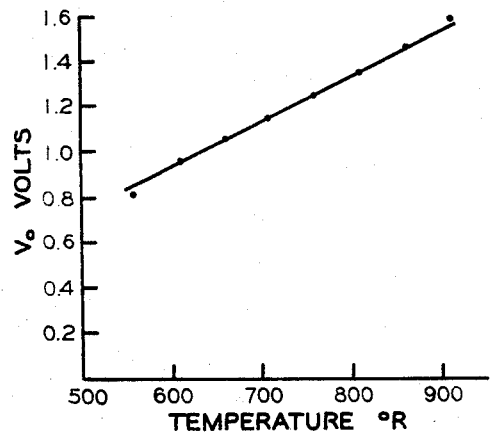
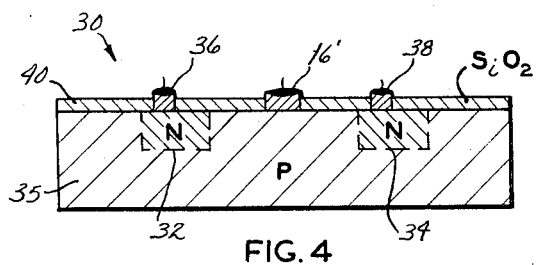
INVENTOR
GENE E. LIGHTNER
BY
ATTORNEY United States Patent Office 3,440,883
Patented Apr. 29, 1969

3,440,883
ELECTRONIC SEMICONDUCTOR
THERMOMETER
Gene E. Lightner, Avondale, Pa., assignor to Monsanto
Company, St. Louis, Mo., a corporation of Delaware
Filed Dec. 1, 1966, Ser. No. 598,283
Int. Cl. G01k 5/18
U.S. Cl. 73—362                    10 Claims

ABSTRACT OF THE DISCLOSURE

A semiconductor thermometer consisting of two substantially identical semiconductor diodes, one diode being reverse biased and connected to the other diode in series and oppositely poled such that the reverse saturation current of the first diode serves as the forward current for the second diode, which second diode is forward biased. A digital voltmeter is connected across the second diode to read voltage changes which correspond to ambient temperature changes.

The present invention relates generally to thermometers, and more particularly to electronic temperature transducer circuitry of the type, wherein the quantitative measurement indicative of temperature is substantially independent of circuit variations, such as supply voltage drifts, and responds linearly with temperature changes.

Heretofore, it has been the general practice to use thermoresistive, thermoelectric and heat-sensitive semiconductor (see U.S. Patent 3,102,425 to Westman et al.) devices as heat sensing elements to enhance the temperature ranges of thermometers which use fluids or gases having limiting freezing or boiling points. Although such devices have served the general purpose, they have not proved completely satisfactory under all conditions of service for the reason that many of these devices heretofore have not responded linearly with temperature, thereby rendering them non-uniform in sensitivity over the temperature range to the measured.

The general purpose of this invention is to provide linear temperature transducer circuitry which embraces all of the advantages of similarly employed thermoresistive, thermoelectric and heat-sensitive semiconductor devices, and yet does not possess the aforedescribed disadvantage of nonlinear temperature response. To attain this, the present invention utilizes a unique combination of semiconductor diodes located in close proximity to each other; the diode combination assuring that a voltage, linear over a prescribed temperature range of diode operation, is provided as the temperature of the diode environment changes.

Accordingly, an object of the present invention is the provision of a novel temperature transducer circuit for generating a voltage which varies linearly with respect to temperature changes over a specified range.

Another object of the present invention is to provide a linear temperature transducer circuit, wherein the measured voltage indicative of temperature is independent of circuit variations, such as supply voltage drifts.

A further object of the invention is the provision of a temperature transducer circuit which utilizes closely matched semiconductor diodes to provide a thermometer of relatively small size.

Still another object of the present invention is to provide a temperature sensitive circuit, wherein semiconductor diodes are fabricated on a single semiconductor chip and utilized to generate a voltage which corresponds linearly to environmental temperature variations.

In the present invention these purposes (as well as others apparent herein) are achieved generally by providing first and second substantially identical semiconductor rectifying junctions which are electrically connected in series circuit between a source of electrical supply voltage and a reference potential. The rectifying semiconductor junctions are poled in opposition to each other so that the reverse saturation current of one of such junctions serves as the forward current for the other junction. Both of the rectifying junctions are spaced in close proximity to one another, whereby temperature changes influence the current conduction of both junctions substantially equally. Voltage measuring means is electrically connected to a circuit point common to both of the semiconductor rectifying junctions for indicating the voltage across one of such rectifying junctions.

I have found that the circuit just briefly described provides voltages that are indicative of the temperature of the environment in which the diodes are placed and is independent of the reverse saturation current which otherwise would render such voltage a nonlinear function of temperature.

Utilization of the invention will become apparent to those skilled in the art from the disclosures made in the following description of a preferred embodiment of the invention, as illustrated in the accompanying drawings, in which:

FIG. 1 is a schematic diagram of a simplified circuit embodiment of the present invention;

FIG. 2 is a schematic diagram of a preferred embodiment of the linear temperature transducer circuitry of the present invention;

FIG. 3 is a graphical representation of the voltage vs. temperature characteristic of the temperature transducer circuitry of FIG. 2; and FIG. 4 is an enlarged cross-sectional view of a portion of a microcircuit chip revealing one possible configuration of the basic circuitry of FIG. 1 in microcircuit form.

Referring now to the drawings, wherein like reference characters designate like or corresponding parts throughout the several views, there is shown in FIG. 1 a linear temperature transducer circuit, generally designated 10, designed in accordance with the present invention. As shown in FIG. 1 the linear temperature transducer circuit 10 includes two diodes 12 and 14 connected in series circuit with each other. The diodes 12 and 14 may be, for example, conventional semiconductor diodes of the well known silicon type (for example, a Transition Inc. type IN914), and are preferably identical insofar as the size of their junction areas and other related electrical characteristics. It should be noted that the diodes 12 and 14 are connected so that their rectifying junctions are poled in opposition to each other. That is, the anodes of the semiconductor diodes 12 and 14 are connected to a common circuit point or terminal 16, and the current which flows through diode 12 in the reverse direction flows through diode 14 in the forward direction.

The D.C. power supply, shown as a battery 18, has its negative terminal connected to a reference potential, shown as ground 20, and its positive terminal connected to a current-limiting resistor 22. For purposes of illustrating the invention, it may be assumed that the battery 18 is a standard 10 volt battery. The current-limiting resistor 22 is connected to the cathode of a voltage-regulating Zener diode 24, whose anode is connected to ground potential 20. For example, the Zener diode may be one chosen to regulate the potential at its cathode at approximately 3.3 volts. The cathode of the semiconductor diode 12 is connected to the common connection 23 between the current-limiting resistor 22 and Zener diode 24, whereby a substantially constant positive potential is provided at connection 23 to reverse bias the diode 12.

As stated, in this circuit arrangement the semiconductor diode 12 is reverse biased, so that the current which flows through it is the reverse saturation current. The cathode of the semiconductor diode 14 is connected to ground potential 20 and is poled such that the reverse saturation current supplied to the common circuit point 16 serves as its forward current.

Connected between the common circuit point 16 between the anodes of the semiconductor diodes 12, 14 and ground 20 is a digital voltmeter 26. The digital voltmeter preferably has a high input impedance of the order of several megohms and serves to indicate the voltage developed across the semiconductor diode 14. This voltage is indicated as the output voltage $V_0$ in the transducer circuitry of FIG. 1.

In order to clearly illustrate the operation of the linear temperature transducer circuit 10 of FIG. 1, it would be well to consider the classic diode equation which is expressed as follows:

$$\ln\left(\frac{I+I_s}{I_s}\right) = \frac{qV}{kT}$$

where

V is the voltage across the diode;
T is absolute temperature;
$q/k$ is the electron charge/Blotsman's constant;
I is the current flow through the diode; and
$I_s$ is the reverse saturation current of the diode.

It may be observed from the equation set forth hereinabove that if the current through the diode I can be made a function of the reverse saturation current $I_s$, then the reverse saturation current $I_s$ will cancel out of the left hand side of the equation. When this has been accomplished, the equation reduces to a linear equation, wherein the remaining variables are those of temperature T and the voltage across the diode V.

Physically the circuit of FIG. 1 realizes the above result and renders the voltage across the semiconductor diode 14 a linear function of the temperature of the environment in which the semiconductor diode 14 is placed. That is, the forward current of the semiconductor diode 14 is for all practical purposes the reverse saturation current $I_s$ of the semiconductor diode 12. If the semiconductor diodes 12 and 14 are closely matched, i.e., substantially of identical construction and have substantially identical electrical characteristics, then the current flow through diode 14 may be given as $I=I_s$. Thus, in this specific case the voltage across the diodes 14 may be given as follows:

$$V_0 = \left[\ln 2 \frac{q}{k}\right] T$$

It should be noted that the voltage $V_0$ across the semiconductor diode 14 is dependent only upon the temperature T of the environment in which it is placed and a calibration constant, $$\frac{k}{q} \ln 2$$

This is true even though the supply voltage provided by battery 18 and the resistor-Zener diode network 22, 24 produce drifts in the supply potential at the cathode of the semiconductor diode 12. In order to enable the linear temperature transducer circuit 10 of FIG. 1 to read directly in units of temperature, the digital voltmeter 26 is calibrated in the well known fashion so that its reading is directly in common engineering units and linearly dependent on the enviromental temperature chages.

In the case of most commonly available, discrete semiconductor diodes, the reverse saturation current is relatively small, on the order of approximately 0.1 of a nanoamp. At such low current values the voltage $V_0$ to be sensed across the diode 14 is somewhat less sensitive than the case where higher levels of current are obtained. The linear temperature transducer circuit 10' of FIG. 2 increases the sensitivity of my invention, so that spurious noise, or the like, does not have an adverse effect on the temperature reading. The circuitry 10' provides enhanced sensitivity by employing a plurality of parallel-connected semiconductor diodes 12' for the single semiconductor diode 12 in substantially the same basic circuit configuration of FIG. 1. Similarly a plurality of serially-connected semiconductor diodes 14' are employed in place of the single semiconductor diode 14 in the circuitry of FIG. 1.

It should be noted that it is preferable to arrange the linear temperature transducer circuitry 10' so that there are an equal number of parallel-connected semiconductor diodes 12' and serially-connected semiconductor diodes 14', although it is not necessary to practice the invention in this manner. Fewer serially-connected diodes 14' may be employed. Inasmuch as the operation of the linear temperature transducer circuit 10' of FIG. 2 is substantially identical to that of FIG. 1, it will not be described in detail.

Where $N_p$ parallel-connected diodes 12' and $N_s$ serially-connected diodes 14' are employed, then as a generalized statement:

$I = N_p I_s$, and the semiconductor diode equation becomes:

$$\ln\left(\frac{N_p I_s I_s}{I_s}\right) = \frac{qV}{kT}$$

The expression for the voltage sensed across the serially-connected diodes $N_s$ then becomes:

$$V_0 = \left[N_s \ln (N_p + 1) \frac{k}{q}\right] T$$

which is observed to be a generalized linear equation with the voltage $V_0$ being dependent only upon the value of the temperature T.

It should be pointed out that if six parallel-connected and six serially-connected diodes 12' and 14' are employed, it has been observed that a reverse saturation current totalling 6 times that of a single reverse-biased diode may be obtained to serve as the forward current for the serially-connnected diodes 14'. At this current magnitude a low output impedance is provided to the digital voltmeter 26, and circuit 10' is relatively insensitive to spurious noise, or the like.

FIG. 3 illustrates the linear temperature response afforded by the temperature transducer circuits 10 and 10'. The values illustrated in FIG. 3 cover a range of over 300° on the Rankine temperature scale; this data was obtained using silicon semiconductor diodes. However, it should be apparent to one skilled in the art that it is possible to extend the range of the temperature transducer of the present invention for higher or lower temperatures using, for example, silicon carbide diodes for higher temperature ranges, germanium diodes for lower temperature ranges, or other semiconductor compound diodes (gallium arsenide, etc.) for specially designated temperature ranges.

Furthermore, although the temperature transducer circuits 10 and 10' may be comprised of discrete semiconductor diodes 12, 12', 14 or 14' having matched electrical characteristics, it is preferable that the diodes be formed on the same semiconductor wafer using well known microcircuit techniques. The fabrication of the rectifying junctions using microcircuit techniques results in substantially identical impurity concentrations in all of the diodes and closely controlled junction areas.

Such a microcircuit configuration is illustrated by the three-terminal device 30 of FIG. 4, wherein two rectifying P-N type junctions 32 and 34 are formed within a common P-doped semiconductor wafer 36. Appropriate contacts and a silicon dioxide passivation layer are shown at 36, 16', 38 and 46 respectively. In contrast to the use of discrete diodes, a three-terminal, microcircuit 30 including diodes having the desired identical electrical characteristics may be produced with the assurance that, when placed in the same environment, the reverse saturation current of one diode which serves as the forward current for the other temperature-sensing diode will be substantially the desired theoretical value.

Obviously, many modifications and variations of the present invention are possible in the light of the above teachings. It is therefore to be understood that the invention may be practiced otherwise than as specifically described.

I claim:

1. An electronic semiconductor thermometer, comprising
   a temperature-sensing semiconductor device including a rectifying junction,
   means electrically connected to said semiconductor device for biasing said rectifying junction in its forward direction, said biasing means providing a current proportional to the reverse saturation current of said semiconductor device and delivering said current to said semiconductor device, whereby said current serves as the forward current for said device, and
   means electrically connected across said semiconductor device for indicating the voltage produced across said temperature-sensing semiconductor device as a result of ambient temperature changes.

2. Linear temperature transducer circuitry, comprising
   a source of electrical energy,
   one end of said source being at a reference potential,
   first and second substantially identical semiconductor rectifying junctions electrically connected in series, said first junction being electrically coupled to the other end of said source of electrical energy and poled in a first direction, said second junction being electrically coupled to said reference potential and poled in opposition to said first junction, whereby the reverse saturation current of said first rectifying junction serves as forward current for said second rectifying junction,
   said first and second rectifying junctions being spaced in close proximity to each other, whereby temperature changes influence the current conduction of said first and second rectifying junctions substantially equally, and
   means electrically connected between a circuit point common to both said first and second rectifying junctions and said reference potential for indicating the voltage across said second rectifying junction.

3. The transducer circuitry of claim 2, wherein both of said rectifying junctions are housed within an integral semiconductor device.

4. The transducer circuitry of claim 2, wherein said rectifying junctions are housed in separate discrete semiconductor devices.

5. Linear temperature transducer circuitry, comprising
   a source of electrical energy,
   one end of said source being at a reference potential,
   first and second substantially identical semiconductor rectifying diodes electrically connected in series circuit, said first diode being electrically coupled to the other end of said source of electrical energy and reverse biased thereby, said second diode being electrically coupled to said reference potential and being poled in opposition to said first diode, whereby the reverse saturation current of said first rectifying diode serves as forward current for said second rectifying diode,
   said first and second rectifying diode being spaced in close proximity to each other, whereby temperature changes influence the current conduction of said first and second rectifying diodes substantially equally, and
   means electrically connected between a circuit point common to both said first and second rectifying diodes and said reference potential for indicating the voltage across said second rectifying diode.

6. The temperature transducer circuit as defined in claim 5, wherein said voltage-indicating means is a digital voltmeter characterized by an input impedance of at least several megohms.

7. Linear temperature transducer circuitry, comprising
   a reference potential,
   a source of electrical energy,
   a plurality of parallel-connected semiconductor diodes electrically coupled to said source of electrical energy and reverse biased thereby,
   a like number of serially-connected semiconductor diodes electrically connected to said parallel-connected diodes and poled in opposition thereto, whereby the reverse saturation currents of said parallel-conected diodes serve as forward current for each of said serially-connected diodes, and
   means electrically connected to a circuit point common to said parallel-conected diodes and at least one of said serially-connected diodes for indicating voltage changes across said serially-connected diodes as a result of ambient temperature changes.

8. An electronic semiconductor thermometer, comprising
   a temperature-sensing diode,
   at least one current-supplying semiconductor diode having impurity dopant concentrations and a rectifying junction substantially identical to said temperature-sensing diode, said current-supplying and temperature-sensing diode being electrically coupled and being poled in opposition to each other, whereby the reverse saturation current of said current-supplying semiconductor diode is delivered to and serves as the forward current for said temperature-sensing diode, and
   an electrical energy source electrically connected to said current-supply diode for reverse biasing said diode.

9. An electronic semiconductor thermometer, comprising
   a temperature-sensing diode,
   a plurality of semiconductor diodes connected in parallel with each other, each of said parallel-connected diodes having electrical characteristics substantially identical to said temperature-sensing diode, said parallel-connected diodes being poled in opposition to said temperature-sensing diode and being each electrically coupled to said temperature-sensing diode, whereby the reverse saturation current of each of said parallel-connected diodes combines to serve as the forward current for said temperature-sensing diode, and
   an electrical energy source electrically connected to said parallel-connected diodes for reverse biasing said diodes.

10. The thermometer, as defined in claim 9, wherein said means for indicating the voltage across said temperature-sensing semiconductor diode is a digital voltmeter having an input impedance of at least several megohms.

References Cited

UNITED STATES PATENTS

| | | | |
|---|---|---|---|
| 2,996,918 | 8/1961 | Hunter. | |
| 3,139,753 | 7/1964 | Brudner. | |
| 3,181,097 | 4/1965 | Lehovec. | |
| 3,182,201 | 5/1965 | Sklar | 307—310 |
| 3,260,115 | 7/1966 | Logan. | |
| 3,330,158 | 7/1967 | Simonyan et al. | |

FOREIGN PATENTS

| | | |
|---|---|---|
| 677,593 | 6/1939 | Germany. |
| 828,307 | 2/1960 | Great Britain. |

LOUIS R. PRINCE, *Primary Examiner.*

FREDERICK SHOON, *Assistant Examiner.*

U.S. Cl. X.R.

307—310

PO-1050
(5/69)

UNITED STATES PATENT OFFICE
CERTIFICATE OF CORRECTION

Patent No. 3,440,883          Dated April 29, 1969

Inventor(s) Gene E. Lightner

It is certified that error appears in the above-identified patent and that said Letters Patent are hereby corrected as shown below:

Column 3, line 24, "Blotsman's" should be --Boltsman's--;
Column 3, line 48, the portion of the formula reading $$2\frac{q}{k} \quad \text{should read} \quad 2\frac{k}{q}$$

Column 3, line 65, "envirometal" should be --enviornmental--;
Column 3, line 65, "chages" should be --changes--. Column 4, line 24, the portion of the formula reading $$\frac{N_p I_s I_s}{I_s} \quad \text{should read} \quad \frac{N_p I_s + I_s}{I_s}$$

Column 6, line 12, "conected" should be --connected--; Column 6, line 15, "conected" should be --connected--.

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents